United States Patent
McLean et al.

(10) Patent No.: US 6,620,863 B1
(45) Date of Patent: Sep. 16, 2003

(54) OPTICAL ELEMENT OF LIGHT LIMITING DOPANT DISTRIBUTED IN VISCOELASTIC HOST MATERIAL

(75) Inventors: Daniel G. McLean, Xenia, OH (US); Michael E. DeRosa, Painted Post, NY (US); Donna M. Brandelik, New Carlisle, OH (US); Angela L. Campbell, Dayton, OH (US); Mark C. Brant, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 9 days.

(21) Appl. No.: 09/874,619

(22) Filed: Jun. 5, 2001

Related U.S. Application Data

(63) Continuation-in-part of application No. 09/323,535, filed on Jun. 1, 1999, now abandoned, and a continuation-in-part of application No. 09/058,126, filed on Apr. 10, 1998, now abandoned.

(51) Int. Cl.$^7$ .......................... C08K 5/56; C08L 63/00; G02B 5/02
(52) U.S. Cl. ...................... 523/456; 252/582; 252/586; 359/240; 359/241; 359/265; 359/321; 359/577; 359/580; 359/582; 359/589; 359/614; 523/458
(58) Field of Search .............................. 252/582, 586; 359/240, 241, 265, 321, 577, 580, 582, 589, 614; 523/456, 458

(56) References Cited

U.S. PATENT DOCUMENTS 5,172,278 A * 12/1992 Tutt ............................ 359/241
5,391,329 A * 2/1995 Dougherty et al. ......... 359/241

FOREIGN PATENT DOCUMENTS

JP          60-87029 A2 *  5/1985
JP          60-90851 A2 *  5/1985

OTHER PUBLICATIONS

Lewis et al., Chemical abstracts accession No. 1990: 148672, Proceedings of the SPIE–The International Society for Optical Engineering, vol. 1165 (1989), pp. 227–236.*
Date et al., Chemical abstracts accession No. 1992:572632, Proceedings of the International Symposium on Electrets, 7$^{th}$ (1991), pp. 460–465.*
Brant et al., Chemical abstracts accession No. 1997:432269, Proceedings of the SPIE–The International Society for Optical Engineering, vol. 2966 (1997), pp. 88–95.*
De Rosa et al., Chemical abstracts accession No. 1997:703139, Proceedings of the SPIE–The International Society for Optical Engineering, vol. 3146 (1997), pp. 134–141.*
De Rosa et al., Chemical abstracts accession No. 1998:33777, Materials Research Society Symposium Proceedings, vol. 479 (1997), pp. 83–88.*
Hack's Chemical Dictionary, McGraw–Hill Book Company, New York, New York, 1967, p. 232, "elastic."*

* cited by examiner

Primary Examiner—Robert E. L. Sellers
(74) Attorney, Agent, or Firm—Fredric L. Sinder; Thomas L. Kundert

(57) ABSTRACT

A damage resistant and tolerant optical element is disclosed. Prior art solid or liquid host matrices are replaced by a soft crosslinked polymer or similar host material. The viscoelastic properties of the matrix host material are controlled during formation so that there are regions of different softness, of stiffness, within the matrix, to form a stiffness gradient. Preferably, the matrix will be softest at a preselected focal plane where maximum electromagnetic radiation or energy output may be expected. The host matrix is doped with a light altering dopant having a concentration distribution, preferably such that the concentration of light limiting dopant is highest in the region where the host matrix material is most soft. Two important disclosed example embodiments are an optical limiter and a solid state dye laser.

10 Claims, 3 Drawing Sheets

OPTICAL ELEMENT OF LIGHT LIMITING DOPANT DISTRIBUTED IN VISCOELASTIC HOST MATERIAL

CROSS-REFERENCE TO RELATED APPLICATIONS

This application is a continuation-in-part from U.S. Pat. application Ser. No. 09/323,535, filed Jun. 1, 1999, now abandoned, and a continuation-in-part from U.S. patent application Ser. No. 09/058,126, filed Apr. 10, 1998, now abandoned, both of which are incorporated by reference into this description.

RIGHTS OF THE GOVERNMENT

The invention described herein may be manufactured and used by or for the Government of the United States for all to governmental purposes without the payment of any royalty.

BACKGROUND OF THE INVENTION

The present invention relates generally to optical elements, and more specifically to optical elements having high damage resistance and tolerance.

A typical optical element requiring high damage resistance and tolerance is an optical limiter. Optical limiters are generally transparent optical elements that block, or limit to a maximum intensity, the transmission of incident light at specific wavelengths. A primary use for optical limiters will be for protection against laser radiation.

Optical limiters may be based on a number of different physical processes, such as scattering, absorption or reflection.

Optical limiters based on absorptive processes can be optimized by controlling the geometrical location of an absorbing species both longitudinally and transversely inside the limiter so that, for example, greater amounts of the absorbing species are located at an expected focal region for incoming laser irradiation. Such optimized optical limiters, however, are subject to optically induced damage inside that focal region. In solid matrices, the damage mechanism may be thermomechanical or thermochemical. Thermomechanical damage occurs by conversion of laser energy to heat at the site of an absorbing inclusion. The rapid heating process at the inclusion causes a thermomechanical fracture to occur in the surrounding matrix or host. The resulting small fracture site is a source for scattering and results in an irreversible damage site.

Prior art optical limiters commonly use solid polymeric plastic host matrices with dopants to produce optimized optical limiters. An example solid polymeric plastic host material is polymethylmethacrylate (PMMA). Unfortunately, the susceptibility of these plastic-based optical elements to damage reduces the range over which this type of solid limiter may be used.

One method for overcoming the problem of permanent damage in a host matrix is to use a liquid limiter based on a chromophore dissolved in a solvent. A chromophore is that portion of a dye molecule that gives it its color and is usually the most fragile part of the molecule. The advantage of liquid limiters is that they are damage tolerant and can undergo "self-healing" once damaged. The self-healing process occurs when the damage site, usually in the form of a bubble, floats away and new solution takes its place. A primary disadvantage of liquid limiters is that their performance cannot be optimized by control of the geometrical placement of absorbing species since liquids cannot preserve a concentration distribution. Liquids are also subject to leaking and other types of failures.

Other rigid host matrix materials exist which exhibit increased damage resistance compared to other polymer materials.

Unfortunately, despite the high damage resistance of some rigid host matrix materials, their operational range as provided through damage resistance is still limited. Further, they exhibit little damage tolerance. Damage tolerance is not the same as damage resistance. Damage resistance indicates the ability to accept higher radiation levels without any apparent effect. Damage resistance can only be increased to some level and then irreversible permanent damage will occur. Damage tolerance, however, as exhibited by, for example, liquid optical limiters, indicates the desirable ability to allow damage to occur temporarily and then subsequently heal. While there is a limit, of course, to damage tolerance before irreversible damage will occur, adding a damage tolerance capability to damage resistance should substantially increase the operational range of optical limiters.

Thus it is seen that there is a need for optimized optical limiters having increased damage resistance and a further need for optimized optical limiters having increased damage tolerance.

Another optical element requiring high damage resistance and tolerance are the gain or lasing media in solid state dye lasers, particularly dye-doped polymer host materials. Such solid state dye lasers are an attractive alternative to more common liquid dye lasers (which use complex organic dyes such as rhodamine 6G in liquid solution or suspension as lasing media), providing the tuning and other advantages of liquid dye lasers without such problems as sealing and the size and complexities of pumping. Polymer host matrices are particularly attractive because, among other reasons, they can be easily doped with dyes at high concentrations. Unfortunately, solid state dye lasers using polymer host materials are severely limited in power output by low damage thresholds.

U.S. Pat. No. 5,610,932 to Kessler et al., which is incorporated by reference into this description, discloses a solid state dye laser host made of a gel material. The use of a gel material appears to result in "'self-healing' after photobleaching due to dye migration," thus avoiding many of the disadvantages of liquid dye lasers without forfeiting as much power output as in most solid state dye lasers. The Kessler et al. invention nevertheless will not be able to achieve the same power outputs as liquid dye lasers.

Thus it is seen that there is also a need for solid state dye lasers having increased damage resistance and tolerance and thus capable of higher power outputs.

Many other, if not most, optical elements will benefit from new apparatus and methods for increasing damage resistance and tolerance to the transmission of light energy through those optical elements.

It is, therefore, a principal object of the present invention to provide optical elements having high damage resistance and tolerance.

It is a feature of the present invention that it provides a nonuniform distribution of dopants, such as light limiting dopants for an optical limiter or lasing media for a solid state dye laser, inside a host material.

It is another feature of the present invention that it adds gradient mechanical properties to optical elements.

It is an advantage of the present invention that it has an ability to form and preserve a dopant concentration distribution not possible in liquids.

It is another advantage of the present invention that it resists agglomeration of particulate dopants, thus providing longer shelf life and more durability against environmental extremes than liquid, solvent-based optical elements.

It is a further advantage of the present invention that it allows both the placement of appropriate dopants and the gradient mechanical properties of a host matrix material to be optimized for maximum performance.

It is a still further advantage of the present invention that it is safer than liquid optical elements where a glass cell may fracture with a resultant spill of hazardous solvents.

These and other objects, features and advantages of the present invention will become apparent as the description of certain representative embodiments proceeds.

SUMMARY OF THE INVENTION

In accordance with the foregoing principles and objects of the present invention, various embodiments of a novel optical element are described. The unique discovery of the present invention is that combining gradient mechanical properties with an optimizable geometrical placement of light altering dopants inside a host matrix results in an efficient, optimizable and highly damage resistant and tolerant optical element. For an optical limiter embodiment, the light altering dopants are absorbing species or other light limiting dopants. For a solid state dye laser embodiment, the light altering dopant is a lasing or gain media. The viscoelastic properties of the host matrix material can be controlled by controlling crosslink density of a crosslinked polymer which, in the optical limiter embodiment, combined with geometrical placement of absorbing species (generally a greater concentration of absorbing species in regions of softer matrix material), makes an optical limiter having a very high laser damage threshold.

Accordingly, the present invention is directed to an optical element, comprising an elastic host material, a light altering dopant inside the elastic host material, and a nonuniform concentration distribution of the light altering dopant inside the elastic host material. The concentration of light altering dopant may increase toward the center of the host material. The concentration of light altering dopant may also increases toward a preselected focal region inside the elastic host material. The optical element may further include regions of different stiffness within the elastic host material, and may also include a gradient stiffness distribution within the elastic host material. The stiffness may decrease toward a preselected focal region inside the elastic host material. The concentration of the light altering dopant may increase toward regions of lesser stiffness.

The present invention is also directed to an optical element, comprising a elastic host material, a light altering dopant inside the elastic host material, a nonuniform concentration distribution of the light altering dopant inside the elastic host material, and regions of different stiffness within the elastic host material. The concentration of light altering dopant may increase toward the center of the host material. The concentration of light altering dopant may also increase toward a preselected focal region inside the elastic host material. The optical element may include a gradient stiffness distribution within the elastic host material. The stiffness may decrease toward a preselected focal region inside the elastic host material. The concentration of the light altering dopant may increase toward regions of lesser stiffness. The light altering dopant may be a nonlinear absorbing chromophore. The nonlinear absorbing chromophore may be copper phthalocyanine. The light altering dopant may also be silicon (IV) 2,3-naphthalocyanine bis (trihexylsilyloxide). The elastic host material may be an epoxy resin.

The present invention is further directed to an optical element, comprising an elastic host material, a light altering dopant inside the elastic host material, and regions of different stiffness within the elastic host material. The optical element may include a gradient stiffness distribution within the elastic host material. The stiffness may decrease toward a preselected focal region inside the elastic host material.

The present invention is still also directed to a method for making an optical element, comprising the steps of providing an elastic host material and doping the elastic host material with a light altering dopant such that there is a nonuniform concentration distribution of the light altering dopant inside the elastic host material.

The present invention is still further directed to a method for making an optical element, comprising the steps of providing an elastic host material having a nonuniform stiffness distribution and doping the elastic host material with a light altering dopant such that there is a nonuniform concentration distribution of the light altering dopant inside the elastic host material.

The present invention is yet also directed to an optical limiter, comprising a first outer layer of a crosslinked polymer host material of a first stiffness, the first outer layer not including a light limiting dopant, a first inner layer of a low crosslink density crosslinked polymer host material next to the first outer layer, the first inner layer having a stiffness less than the first outer layer and including a light limiting dopant, a second inner layer of a low crosslink density crosslinked polymer host material next to the first inner layer, the second inner layer having a stiffness less than the first inner layer and including a light limiting dopant, and a second outer layer of a crosslinked polymer host material next to the second inner layer, the second outer layer having the same stiffness as the first outer layer, and the second outer layer not including a light limiting dopant.

The present invention is yet further directed to an optical limiter, comprising a plurality of layers of crosslinked polymer host material, wherein the stiffness of successive layers decreases from layer to layer from the outermost layers to the innermost layers and wherein a plurality of inner layers are doped with a light limiting dopant such that the amount of doping successively increases from layer to layer from the outermost of the inner layers to more innermost layers.

The present invention is moreover directed to a method for limiting the transmission of electromagnetic energy comprising placing in the path of the electromagnetic energy an optical limiter comprising a low crosslink density crosslinked polymer host material having an optical limiting dopant within the crosslinked polymer host material and a nonuniform concentration distribution of the optical limiting dopant within the crosslinked polymer host material.

The present invention is still moreover directed to a method for limiting the transmission of electromagnetic energy comprising placing in the path of the electromagnetic energy an optical limiter comprising a crosslinked polymer host material having an optical limiting dopant within the crosslinked polymer host material, a nonuniform concentration distribution of the optical limiting dopant within the crosslinked polymer host material, and regions of different stiffnesses within the crosslinked polymer host material. The concentration of light limiting dopant may increase toward the center of the crosslinked polymer host material. The stiffness of the crosslinked polymer host material may decrease toward a preselected focal region inside the crosslinked polymer host material. The concentration of light emitting dopant may also increase toward regions of lesser stiffness.

BRIEF DESCRIPTION OF THE DRAWINGS

The present invention will be more clearly understood from a reading of the following detailed description in conjunction with the accompanying drawings wherein.

DETAILED DESCRIPTION

Figure 1:
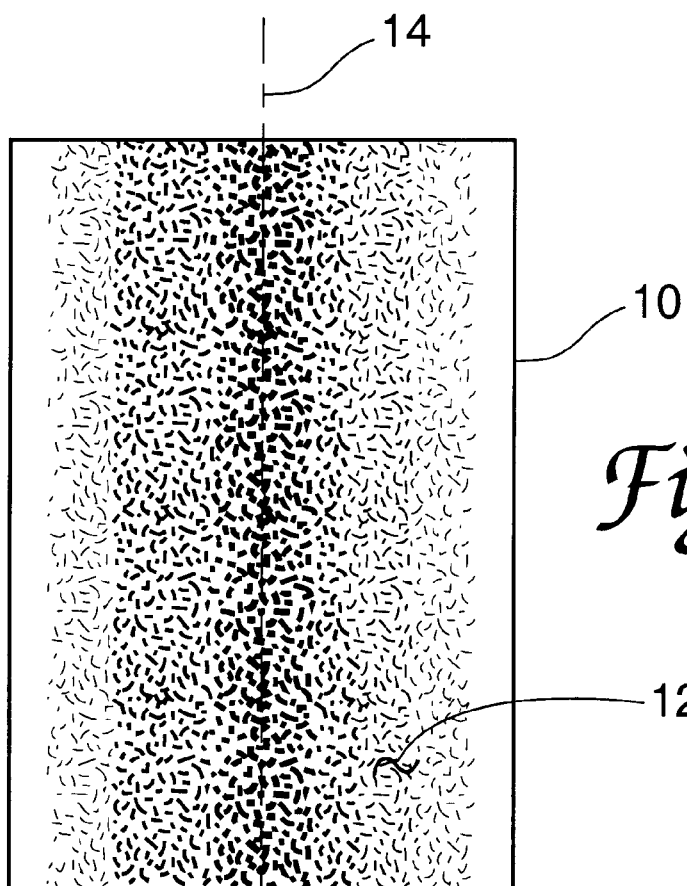
FIG. 1 is a schematic representation of a crosslinked polymer-based optical limiter embodiment of the present invention showing a distributive doping of an optical limiting dopant inside a crosslinked polymer matrix.

Referring now to FIG. 1 of the drawings, there is shown a schematic representation of a crosslinked polymer-based optical limiter 10 embodiment of the present invention showing a distributive doping of an optical limiting dopant 12. Optical limiter 10 takes the best properties of solid and liquid limiters and combines them into an improved optical element. Replacing a prior art solid or liquid host matrix with a soft crosslinked polymer or similar material does this. The softness of the crosslinked polymer, made by using a low crosslink density crosslinked polymer, enables the chemical structure to withstand, and possibly dissipate, any thermally-induced mechanical stress which would otherwise cause a fracture at a heated inclusion site.

The viscoelastic, or mechanical, properties of the crosslinked polymer host material, that is, how soft or stiff the crosslinked polymer, is determined by crosslink density. Crosslink density can be controlled by carefully choosing the type of prepolymer and crosslinker precursor components and the ratio of the mixture between the two. Optimum crosslinked polymers can be fabricated with desired viscoelastic properties depending on the application.

Figure 2:
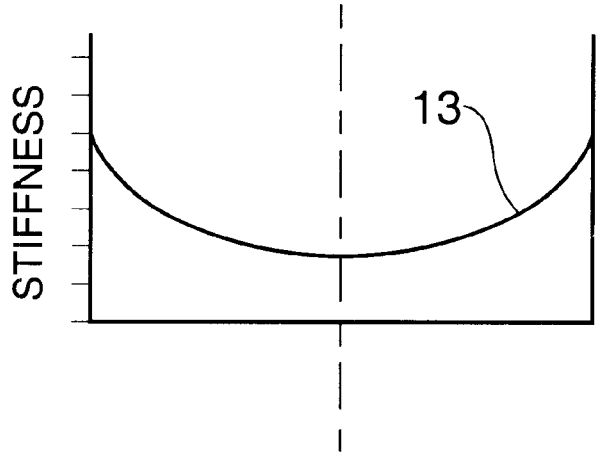
FIG. 2 is a graph of distribution stiffness for the crosslinked polymer-based optical limiter of FIG. 1.

In the present invention, not only is the concentration of the optical limiting dye at desired locations in the host controlled, but the viscoelastic properties of the crosslinked polymer can also be controlled at different locations within the crosslinked polymer. FIG. 2 is a graph of a representative distribution stiffness 13 for the optical limiter 10 embodiment of the present invention. To optimize the performance of the material, the highest concentration of dye is placed in the region of lowest crosslink density (the soft, or least stiff, region of the host). The final material comprises a gradient optical limiter 10 where the dye concentration is lowest at the surface where the laser is incident and increases further along the sample until it gets to the highest concentration at a focal plane 14 where the sample is softest and has the highest laser damage threshold.

The optical limiter 10 embodiment comprises mainly two components, a host material and a dopant material. The distinction between these two components can become blurred, and the process is thus not confined to only systems comprising these two types of components. Moreover, each component such as the host may itself be produced from more than one component.

The chemically crosslinked polymer starts as a mixture of monomer units or multi-functional polymers and crosslinking units. Cross-linking may be initiated by conventional methods such as application of heat or optical radiation. Cross-linking causes a network to be established inside the crosslinked polymer with the rigidity of the network determined by the extent of the crosslinking, the rigidity of the crosslinked molecules themselves, and the amount and type of monomer material present. The inclusion or addition of a solvent plasticizer may additionally modify the rigidity. The extent of cross-linking, presence of monomer units and presence of solvent also determine the diffusive mobility of a guest type dopant.

Once an appropriate crosslinked polymer host material has been selected, an optical limiting dopant, usually an optical limiting chromophore dopant, is selected as a guest component to produce the optical limiting effect. There are many possible dopants with varying properties and for varying purposes. A chromophore is, very broadly, a "color" "structure," and may comprise any of a very large variety of different compounds. Suitable chromophores may be found, for example, in F. L. Green, The Sigma-Aldrich Handbook of Stains, Dyes and Indicators, Aldrich Chemical Company, Inc., 1990. Some chromophore dopants that have been used in optical limiters include various chromophore dyes, as described in U.S. Pat. No. 5,657,345 to Gordon, that are one or more porphyrin complexes which have been modified by metals to form a metallo-porphyrin complex. Examples of such chromophores are t-butylated vanadyl phthalocyanine, stanous chloride t-butylated phthalo-cyanine and zinc octabromotetraphenyl. Examples of optical limiting dopants other than chromophores are particulates, usually carbon particulates, including buckminsterfullerenes. Dopants can exhibit non-linear absorbing or nonlinear refractive properties, either alone or in conjunction with the host material. Dopants can also be used to simply change the linear properties of an optical element as a function of geometrical position within the element. A chromophore can be incorporated into a matrix either by simple mixing or by covalent attachment (to the polymer or to the predecessor monomer) by means of a chemical reaction. Ultimately, the crosslinked polymer host and the optical limiting chromophore are combined in such a manner so as to produce a concentration gradient, or more broadly described, a concentration distribution of the dopant. The host material is crosslinked chemically to lock the distribution into place. Post-treatment with solvent to change the rigidity characteristics may be necessary with these crosslinked polymers. Additional post-treatment to remove solvent, residual monomer or dopant may be necessary to achieve both the desired rigidity and concentration distribution.

Having first received the teachings of the present invention for using a nonuniform concentration distribution of appropriate dopants and regions of different stiffness within a host matrix to increase damage resistance and tolerance of optical elements, the determination for different applications of an appropriate level and distribution of stiffness of a host matrix material and the concentration distribution of appropriate dopants best suited for each different application, and the choice of appropriate conventional methods for making such materials, is well within the level of ability of those of ordinary skill in the art of the invention.

Figure 3:
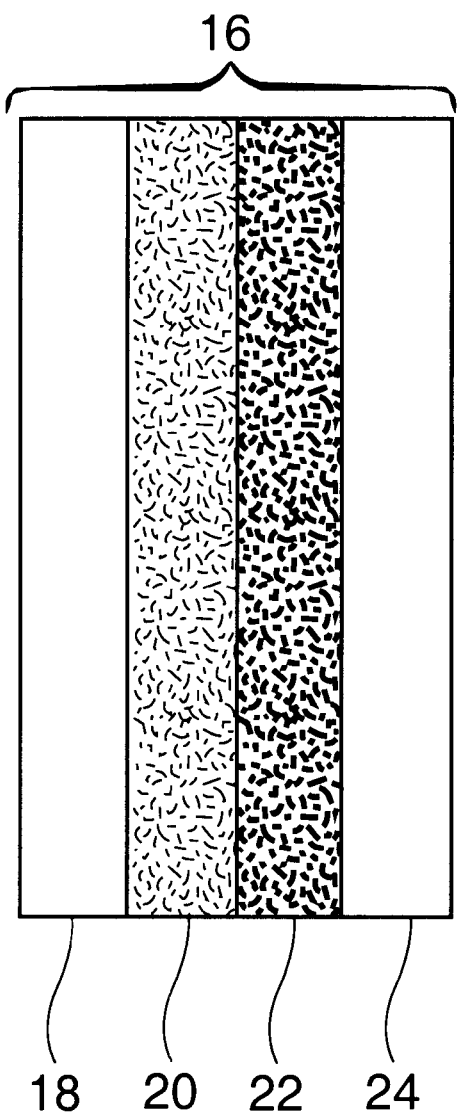
FIG. 3 is a schematic representation of a multilayer crosslinked polymer-based optical limiter embodiment of the present invention showing multiple layers of varying rigidity, or stiffness, and dopant concentration.

FIG. 3 shows an example of another crosslinked polymer-based optical limiter 16 embodiment of the present invention. Optical limiter 16 uses an epoxy resin-based (or polyepoxide) host material 2, in this embodiment, EPO-TEK 301-2, and the optical limiting chromophore silicon (IV) 2,3-naphthalocyanine bis(trihexylsilyloxide). Alternately, zinc octabromotetraphenyl porphyrin was used as the dopant. The epoxy resin is a thermoset, that is, a crosslinked material crosslinked by a thermal crosslinking mechanism. It can be made very hard or very soft depending on the extent of crosslinking allowed during formation. It can also be made gel-like. While an epoxy resin is more often thought of as an elastomer than as a crosslinked polymer or crosslinked polymer-like material, it can be viewed as a crosslinked polymer or crosslinked polymer-like material, particularly if made soft enough. Optical limiter 16 is made by mixing two components of the epoxy resin host, part A (prepolymer) and part B (hardener), with three different ratios of hardener (B) to prepolymer(A), or B/A. Each mixture with its own ratio has different concentrations of the optical limiting chromophore. The chromophore is incorporated into the matrix material by mixing. Mixture 1 has the highest B/A ratio (0.30–0.35) and has no chromophore. Mixture 2 has a lower B/A ratio and the lowest concentration of chromophore (approx. <0.1 mg/gram of epoxy resin). Mixture 3 has the lowest B/A ratio and the highest concentration of chromophore (approx. 0.1 mg/gram of epoxy resin). Mixture 3 is a low crosslink density epoxy resin which can be described as a gel, but is actually a very high viscosity liquid. Mixture 3 may be more accurately described as a very low crosslink density polymer, but for purposed of this description, "low" is understood to include both "low" and "very low." Very low crosslink densities usually result in a gel or gel-like material. Low crosslink densities usually result in an elastomer having rubbery mechanical properties. The mixtures are applied in layers. Mixture 1 is used for a first layer 18, mixture 2 for a second layer 20, mixture 3 for a third layer 22 and mixture 1 for a fourth layer 24. Each layer is allowed to partially cure by heating before applying the next successive layer on top. The final material is a "sandwich" comprising a distribution of chromophore concentration and crosslink density at each layer with the highest dye content in the softest part of the host in third layer 22. Cross-linking also occurs between layers, resulting in a monolithic optical element. This technique can also be used to make many more layers with a broader and smoother distribution of dye concentration and crosslink density.

An advantage of the step-wise varying properties of the FIG. 3 embodiment of the present invention is that the use of relatively stiff outside layer permits the use of relatively soft inner layers, preferably soft enough to exhibit self-healing. The use of relatively stiff outside layers, particularly fully enclosing outside layers, also permits the use of very soft inside layers and still have a self-standing overall structure. The relatively stiff outside layers may also be polished. Additionally, by allowing some cross-linking to occur between layers, as previously described, a monolithic optical element can be made with many desirable physical properties combined into a single optical element.

Figure 4:
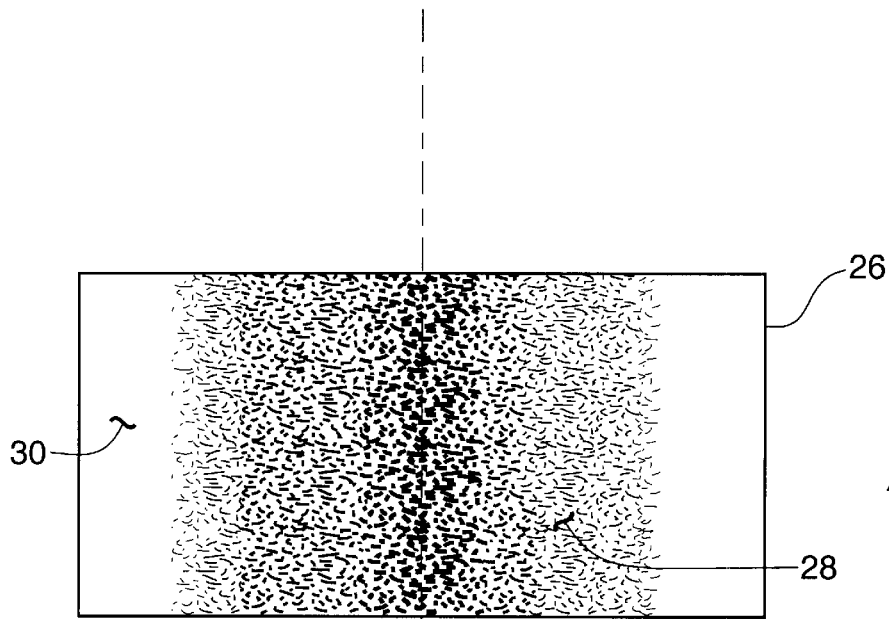
FIG. 4 is a schematic representation of a solid state dye laser embodiment of the present invention showing a distributive doping of dye inside a polymer host matrix; and, FIG. 5 is a graph of distribution stiffness for the polymer host matrix of the solid state dye laser of FIG. 4.

FIG. 4 is a schematic representation of a optical cavity element 26 of a solid state dye laser embodiment of the present invention showing a distributive, or non-uniform, doping of lasing dye 28 inside the polymer host matrix 30 of optical cavity element 26.

Example appropriate laser dyes for a solid state dye laser are described in earlier mentioned U.S. Pat. No. 5,610,932 to Kessler et al.

Figure 5:
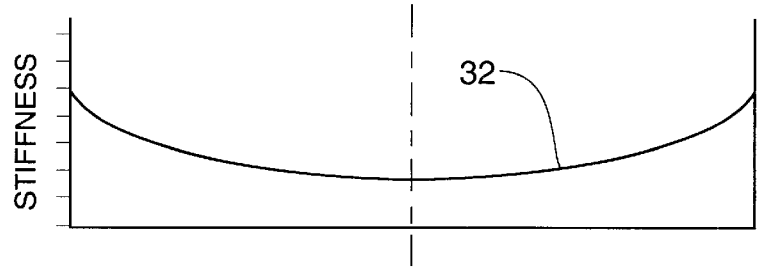

FIG. 5 is a graph of a distribution stiffness 32 for polymer host matrix 30 of the solid state dye laser of FIG. 4. Analogous to the FIG. 1 optical limiter embodiment of the present invention, a center area of polymer host matrix 30 may be made softer than the outer sections.

The disclosed various example embodiments of optical elements made according to the teachings of the present invention successfully demonstrate the advantages of combining gradient mechanical properties with a gradient dopant concentration in a crosslinked polymer-based optical limiter. They also successfully demonstrate the advantages of combining a low crosslink density crosslinked polymer with a nonuniform distribution of dopant. They further successfully demonstrate the advantages of those teachings to any optical element, including the disclosed example embodiment of a solid state dye laser. Although the disclosed invention is specialized, its teachings will find application in other areas where the prior art is presently limited to an either/or choice between different features depending on a choice of starting material, and a selection of an alternate starting material, modified according to the teachings of the present invention, may produce a new combination that combines the best properties of the prior art into a single device.

Those with skill in the art of the invention will readily see that such terms as stiffness, crosslink density, softness, rigidity and hardness may have precise technical definitions, but as used in this description are understood to have less precise definitions incorporating the physical properties of any crosslinked polymers or crosslinked polymer-like materials (generally of low crosslink density), or any other material exhibiting the described desirable physical properties. The term stiffness as used in the claims is understood to mean generally the opposite of the term softness and is used primarily because the use of the term softness might appear to imply that a host matrix does not have structural integrity, that is, that it could not stand on its own and would always need a transparent enclosure of some sort. Similarly, the term crosslinked polymer includes crosslinked polymer-like and similar materials. Therefore, the term elastic materials or elastic host materials is generally used in the claims to make more clear that what is claimed in all the claims includes more than the specifically described example embodiments. The described crosslinked polymer and crosslinked polymer-like materials, or as claimed, any such elastic host materials, generally will have sufficient structural integrity to stand on their own, but those with skill in the art of the invention will readily see that the use of softer crosslinked polymers which require enclosure are not excluded and are still within the intended scope of the claims, as demonstrated by the FIG. 3 embodiment of the invention. Usually, an appropriate host material will have rubbery or even gel-like properties at room temperature. Other possible thermoset materials include polybutadienes, silicones and urethanes. The host material may also be a thermoreversible gel, such as a gelatin. A gelatin, or other thermoreversible, gel may be difficult to make into a gradient structure. The softness of a suitable crosslinked polymer or similar material is generally limited by the requirement that it be sufficiently rigid to confine an absorbing species or other light limiting or altering dopant to a geometrical location so that a distribution can be formed.

Those with skill in the art of the invention will also readily see that the concepts of damage resistance and damage tolerance may be argued among those so skilled, and that a more general concept of increasing the damage threshold of such optical elements may be understood as a more general description of the intended result of the teachings of the present invention.

Those with skill in the art of the invention will further readily see that the described optical limiters can be optimized by controlling the geometrical location of an absorbing species, and the softness of a host matrix, both longitudinally and transversely inside the limiter, and not just along a single axis. Those with skill in the art will also see that the invention as variously claimed may describe an optical limiter component of a more complex optical limiter and are not intended to be limited to an optical limiter consisting of only the claimed elements. It is understood, therefore, that other a modifications to the invention may be made, as might occur to one with skill in the field of this invention, within the scope of the appended claims. All embodiments contemplated have not been shown in complete detail. Other embodiments may be developed without departing from the spirit of this invention or from the scope of the claims.

We claim:
1. A light altering optical element, comprising:
    (a) an viscoelastic host material comprising a crosslinked epoxy resin;
    (b) a light limiting dopant inside the viscoelastic host material;
    (c) a nonuniform concentration distribution of the light limiting dopant inside the viscoelastic host material; and,
    (d) regions of different stiffness within the viscoelastic host material.
2. The light altering optical element according to claim 1, wherein the concentration of light limiting dopant increases toward the center of the viscoelastic host material.
3. The light altering optical element according to claim 1, wherein the concentration of light limiting dopant increases toward a preselected focal region inside the viscoelastic host material.
4. The light altering optical element according to claim 1, further comprising a gradient stiffness distribution within the viscoelastic host material.
5. The light altering optical element according to claim 4, wherein the stiffness decreases toward a preselected focal region inside the viscoelastic host material.
6. The light altering optical element according to claim 5, wherein the concentration of the light limiting dopant increases toward regions of lesser stiffness.
7. The light altering optical element according to claim 1, wherein the light altering dopant is a nonlinear absorbing chromophore.
8. The light altering optical element according to claim 7, wherein the non-linear absorbing chromophore is copper phthalocyanine.
9. The light altering optical element according to claim 1, wherein the light limiting dopant is silicon (IV) 2,3-naphthalocyanine bis(trihexylsilyloxide).
10. A method for making a light altering optical element, comprising the steps of:
    (a) providing an viscoelastic host material, comprising a crosslinked epoxy resin, having a nonuniform stiffness distribution; and,
    (b) doping the viscoelastic host material with a light limiting dopant such that there is a nonuniform concentration distribution of the light limiting dopant inside the viscoelastic host material.

* * * * *